(12) United States Patent
Ebbers et al.

(10) Patent No.: US 12,325,534 B2
(45) Date of Patent: Jun. 10, 2025

(54) AIRCRAFT LIGHT, AIRCRAFT COMPRISING AN AIRCRAFT LIGHT, AND METHOD OF MANUFACTURING AN AIRCRAFT LIGHT

(71) Applicant: Goodrich Lighting Systems GmbH & Co. KG, Lippstadt (DE)

(72) Inventors: Thomas Ebbers, Lippstadt (DE); Manfred Listner, Lippstadt (DE); Jothimurugan Uthaiyasuriyan, Lippstadt (DE); Markus Katzenmayer, Lippstadt (DE)

(73) Assignee: Goodrich Lighting Systems GmbH & Co. KG, Lippstadt (DE)

( * ) Notice: Subject to any disclaimer, the term of this patent is extended or adjusted under 35 U.S.C. 154(b) by 0 days.

(21) Appl. No.: 18/598,305

(22) Filed: Mar. 7, 2024

(65) Prior Publication Data
US 2024/0308684 A1 Sep. 19, 2024

(30) Foreign Application Priority Data

Mar. 14, 2023 (EP) ..................................... 23161724

(51) Int. Cl.
*B64D 47/06* (2006.01)
*B33Y 80/00* (2015.01)
(Continued)

(52) U.S. Cl.
CPC .............. *B64D 47/06* (2013.01); *B33Y 80/00* (2014.12); *F21V 23/007* (2013.01); *B64D 11/00* (2013.01); *B64D 2011/0053* (2013.01)

(58) Field of Classification Search
CPC .......... F21V 23/007; B64D 2011/0053; B64D 2011/00; B33Y 80/00
See application file for complete search history.

(56) References Cited

U.S. PATENT DOCUMENTS

| | | | | |
|---|---|---|---|---|
| 6,268,702 B1 * | 7/2001 | Fleck | ................... | H05B 45/395 315/192 |
| 6,761,472 B1 * | 7/2004 | Cleaver | ..................... | F21S 4/20 362/267 |

(Continued)

FOREIGN PATENT DOCUMENTS

EP 1495910 A2 * 1/2005 ............... B60Q 3/43

OTHER PUBLICATIONS

European Patent Office; European Search Report filed Sep. 8, 2023 in Application No. 23161724.2.

*Primary Examiner* — Zheng Song
(74) *Attorney, Agent, or Firm* — SNELL & WILMER L.L.P.

(57) ABSTRACT

An aircraft light comprises at least one light source and a local electric power supply for supplying electric power to the at least one light source. The local electric power supply comprises a power supply housing, which is produced by additive manufacturing and comprises a compartment accommodating power supply electronics and at least one hollow cavity, which is delimited from the compartment. The compartment is filled with a potting material. The aircraft light further comprises a plurality of electric connections extending from the power supply electronics through the potting material to the at least one light source for supplying electric power to the at least one light source, thus enabling an aircraft light output of the aircraft light.

17 Claims, 5 Drawing Sheets

(51) Int. Cl.
*F21V 23/00* (2015.01)
*B64D 11/00* (2006.01)

(56) References Cited

U.S. PATENT DOCUMENTS

| | | | |
|---|---|---|---|
| 6,798,154 B1* | 9/2004 | Sullivan | F21S 8/00 |
| | | | 315/158 |
| 10,276,954 B2 | 4/2019 | DeAngelo | |
| 11,056,447 B2 | 7/2021 | Pfefferlein | |
| 11,056,460 B2 | 7/2021 | Pfefferlein et al. | |
| 2005/0110649 A1 | 5/2005 | Fredericks et al. | |
| 2008/0238345 A1* | 10/2008 | Jaan | F21S 9/037 |
| | | | 315/312 |
| 2018/0099763 A1 | 4/2018 | Hills et al. | |
| 2022/0106057 A1* | 4/2022 | Mukai | F21V 5/04 |
| 2023/0400161 A1* | 12/2023 | Trundle | B60Q 3/78 |

* cited by examiner

AIRCRAFT LIGHT, AIRCRAFT COMPRISING AN AIRCRAFT LIGHT, AND METHOD OF MANUFACTURING AN AIRCRAFT LIGHT

CROSS-REFERENCE TO RELATED APPLICATIONS

This application claims priority to EP Patent Application No. 23161724.2, filed Mar. 14, 2023 and titled "AIRCRAFT LIGHT, AIRCRAFT COMPRISING AN AIRCRAFT LIGHT, AND METHOD OF MANUFACTURING AN AIRCRAFT LIGHT," which is incorporated by reference herein in its entirety for all purposes

FIELD

The present invention relates to aircraft lighting. In particular, the present invention relates to an aircraft light. The present invention further relates to an aircraft comprising such an aircraft light, and to a method for manufacturing an aircraft light

BACKGROUND

Almost all aircraft are equipped with numerous lights, including exterior aircraft lights and interior aircraft lights. In particular, large passenger airplanes are provided with a wide variety of exterior and interior aircraft lights.

Exterior aircraft lights are employed for a wide variety of different purposes, such as for allowing the passengers and/or air crew to view the outside, for passive visibility, for signaling purposes, etc. Examples of such exterior light units are navigation lights, also referred to as position lights, red-flashing beacon lights, white strobe anti-collision lights, wing scan lights, take-off lights, landing lights, taxi lights, runway turn-off lights, etc.

Passenger aircraft, such as commercial airplanes, comprising a passenger cabin with passenger seats, are usually equipped with general passenger cabin lights for illuminating the passenger cabin and washroom lights for illuminating washrooms. Such passenger aircraft are usually further equipped with a plurality of individually switchable passenger reading lights and a plurality of individually switchable signal lights. All of these lights are examples of interior aircraft lights.

Aircraft lights often comprise a local power supply, configured for conditioning/supplying electric power to the light source(s) of the respective aircraft light. The local power supply may comprise a housing that accommodates power supply electronics. For protecting the power supply electronics from adverse environmental influences, such as moisture, water, dirt etc., an empty space, which is present within the power supply housing after the power supply electronics have been installed, may be filled with a potting material that encloses and seals the power supply electronics.

Conventionally, the walls of the housing are made of metal. The combined weight of the metallic walls of the housing and the potting material may result in a high weight of the local power supply. Such a high weight is, however, undesirable in the context of aircraft.

It would therefore be beneficial to provide an aircraft light with a local electric power supply that has a low weight, while having good mechanical and electrical properties. It would further be beneficial to provide an aircraft equipped with such an aircraft light and a method for manufacturing such an aircraft light.

SUMMARY

According to an exemplary embodiment of the invention, an aircraft light comprises at least one electric light source, such as an LED, and a local electric power supply for supplying electric power to the at least one light source. The local electric power supply comprises a power supply housing, which is produced by additive manufacturing. Additive manufacturing may also be referred to as 3D-printing. The power supply housing comprises a compartment accommodating power supply electronics and at least one hollow cavity, which is delimited from the compartment. The compartment, but not the at least one hollow cavity, is filled with a potting material enclosing the power supply electronics. The aircraft light further comprises a plurality of electric connections extending from the power supply electronics through the potting material to the at least one light source for supplying electric power to the at least one light source, thereby enabling an aircraft light output of the aircraft light.

Exemplary embodiments of the invention further include a method for manufacturing an aircraft light, which is to be mounted to an aircraft, wherein the method comprises the steps of providing at least one light source and forming a power supply housing of a local electric power supply, which is configured for supplying electric power to the at least one light source, by additive manufacturing. The power supply housing is formed to comprise a compartment and at least one hollow cavity, which is delimited from the compartment. The compartment is provided for accommodating power supply electronics. The method further comprises placing power supply electronics within the compartment of the power supply housing and coupling a plurality of electric connections to the power supply electronics with their first ends; filling the compartment with a potting material, with the potting material enclosing the power supply electronics and with the plurality of electric connections extending through the potting material; and electrically coupling the plurality of electric connections to the at least one light source with their second ends, in order to allow for supplying electric power to the at least one light source, thus enabling an aircraft light output of the aircraft light in operation.

In accordance with exemplary embodiments of the invention, the second ends of electric connections may be coupled to the at least one light source before or after the compartment has been filled with the potting material.

By providing at least one hollow cavity in the power supply housing, the empty space within the power supply housing, which is filled with the potting material, may be reduced. In consequence, less potting material may be filled into the power supply housing, and the weight of the local electric power supply may be reduced.

Forming the power supply housing by additive manufacturing allows for large flexibility in forming the power supply housing and, in particular, the at least one hollow cavity within the power supply housing. By additive manufacturing, outer and inner walls of the power supply housing and hollow cavities within the power supply housing having almost arbitrary geometries may be formed. This may allow for adjusting the geometries of the outer and inner walls and of the hollow cavity/cavities to the geometry of the power supply electronics. In this way, it is possible to considerably reduce the remaining empty space, which is filled with the potting material.

Forming the outer and inner walls of the power supply housing by additive manufacturing may in particular allow for forming undercuts and/or similar geometric structures, which may not be formed or which may at least not be formed as easily by molding or other alternative manufacturing techniques.

As a result, a local electric power supply having less weight than a conventional local electric power supply may be provided conveniently and at low costs. Also, as compared to other manufacturing techniques, local electric power supplies may be produced in low numbers, e.g. when required in retrofitting application scenarios, without having to provide complex and expensive tooling.

In an embodiment, the potting material is impermeable to liquids, such as water, and/or gases, such as air. In this way, the potting material may be well-suited for reliably protecting the power supply electronics from adverse external influences, which may adversely affect the functionality of the power supply electronics.

The potting material may be configured for providing its protective functionality over a wide range of temperatures, as may occur in an aircraft environment. The potting material may in particular be configured for providing its protective functionality over a temperature range from −55° C. to +80° C.

The potting material may be a silicone or resin based material.

In an embodiment, ULTEM 9085 is used as the material for additive manufacturing. ULTEM 9085 has been found to be very suitable for forming the power supply housing by additive manufacturing. There are also other suitable materials for additive manufacturing for aerospace applications that can be used, e.g. ULTEM 1010.

In an embodiment, the at least one hollow cavity is formed within the outer walls of the power supply housing. The external geometry of the power supply housing is defined by the outer walls, and this geometry is not changed by forming the at least one hollow cavity within, but not outside, of the outer walls. The external geometry may be set in accordance with external requirements, in particular in accordance with the dimensions of the space, which is available within the aircraft for accommodating the local electric power supply. The external geometry may also be set by other requirements, such as approved mounting fixtures for the aircraft light/for the local electric power supply of the aircraft light.

In an embodiment, the power supply housing comprises a plurality of hollow cavities, wherein these hollow cavities are defined by inner walls formed within the power supply housing. At least some of the plurality of hollow cavities and/or inner walls may be arranged in a configuration that forms a nested structure of cavities, such as a honeycomb structure or other nested structure. Similarly, the method for manufacturing the aircraft light may include forming a plurality of hollow cavities within the power supply housing, wherein at least some of the plurality of hollow cavities may be arranged in a nested structure, such as a honeycomb structure or other nested structure.

A configuration comprising a honeycomb structure/other nested structure may result in an increased mechanical stability of the power supply housing. Simultaneously, such a configuration may provide for a large empty volume, which is occupied by the hollow cavities and not filled with the potting material.

In an embodiment, the power supply housing further comprises at least one filled portion, which also may be referred to as at least one solid infill. The at least one filled portion/solid infill may extend from an outer wall of the power supply housing wall into the compartment. The at least one filled portion/solid infill may in particular form an undercut within the compartment. At least a portion of the power supply electronics, for example a portion of a printed circuit board of the power supply electronics, may be arranged within the undercut, thereby contributing to a positional fixation of the power supply electronics within the power supply housing.

Additive manufacturing is well suited for forming undercuts and similar geometric structures, which may not be formed easily or which may even be impossible to be formed by alternative manufacturing techniques, such as molding.

In an embodiment, the at least one infill is solidly made from the same material as the power supply housing, for example from ULTEM 9085 or ULTEM 1010. Using the same material for the at least one infill and for the power supply housing may allow for forming the at least one infill and the power supply housing in a joint process, in particular via additive manufacturing. This may facilitate and accelerate the manufacturing of the power supply housing comprising at least one infill.

In an embodiment, the power supply housing accommodates control electronics for controlling an operation of the at least one light source. The control electronics may in particular be integrally formed with the power supply electronics. Accommodating control electronics for controlling an operation of the at least one light source in the power supply housing may allow for reducing the total volume of the aircraft light. Providing the control electronics integrally with the power supply electronics may allow for a very compact configuration, which may allow for reducing the volume, the weight and the costs of the local electric power supply.

In an embodiment, the aircraft light comprises a lighting module. The lighting module may comprise the at least one light source. The lighting module may in particular house the at least one light source. The lighting module may further comprise/house at least one optical element, which is provided for shaping the aircraft light output of the aircraft light, e.g. by forming the aircraft light output from light emitted by the at least one light source.

The at least one optical element may include at least one lens and/or at least one reflector and/or at least one shutter.

In an embodiment, the power supply housing is formed integrally with the lighting module, the power supply housing may in particular be formed integrally with the lighting module by additive manufacturing. Forming the power supply housing integrally with the lighting module may provide for a very efficient way of manufacturing the aircraft light.

In an embodiment, the power supply housing may be provided spatially separated from the lighting module and/or the power supply housing may be mounted to the lighting module. In such an embodiment, the method for manufacturing the aircraft light may include mounting and fixing the power supply housing to the lighting module.

Providing the lighting module separately from the local power supply may provide additional flexibility for installing the aircraft light within an aircraft. It may further allow for maintaining and/or repairing and/or replacing the lighting module and the local power supply independently of each other, in case this should be necessary or expedient for repair and/or maintenance.

An aircraft light according to an exemplary embodiment of the invention may be an exterior aircraft light. An aircraft light according to an exemplary embodiment of the invention may in particular be a take-off light, a landing light, a taxi light, a runway turn-off light, a navigation light, a white strobe anti-collision light, a red-flashing beacon light, or a multi-functional light, which combines the functionalities of at least two of a take-off light, a landing light, a taxi light, a runway turn-off light, a navigation light, a white strobe anti-collision light, and a red-flashing beacon light.

In an embodiment, the aircraft light is an interior aircraft light. The interior aircraft light may be provided within an aircraft for illuminating an area or space within the aircraft. The interior aircraft light may in particular be a general cabin illumination light for illuminating at least a portion of the cabin of an aircraft, a personal passenger reading light, a washroom illumination light for illuminating a washroom of an aircraft, or a signal light. The signal light may, for example, be a non-smoking light, a fasten-your-seatbelt light or an indicator light which lights up in case a request for the cabin service personnel has been triggered. An interior aircraft light according to an exemplary embodiment of the invention may also be used for indicating an exit, an emergency exit and/or the shortest way to the nearest exit and/or emergency exit.

Exemplary embodiments of the invention further include an aircraft, such as an airplane or a helicopter, which is equipped with at least one aircraft light according to an exemplary embodiment of the invention. The additional features, modifications and effects, as described above with respect to an aircraft light and/or with respect to a method for manufacturing an aircraft light, apply to the aircraft in an analogous manner.

BRIEF DESCRIPTION OF THE DRAWINGS

Further exemplary embodiments of the invention are described below with respect to the accompanying drawings, wherein.

DETAILED DESCRIPTION

Figure 1A:
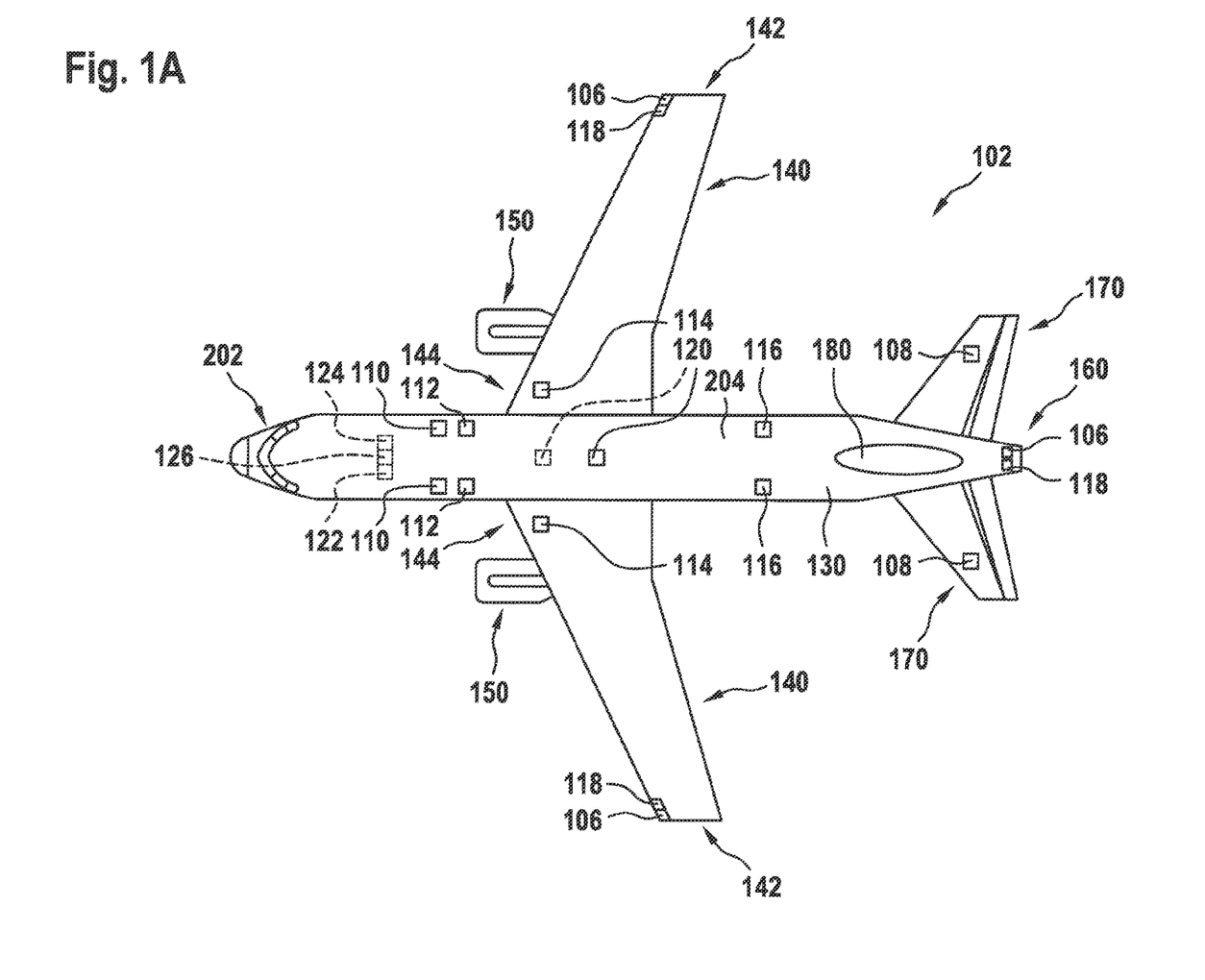
FIG. 1A shows a schematic top view of an aircraft, which is equipped with a variety of exterior aircraft lights.
Figure 1B:
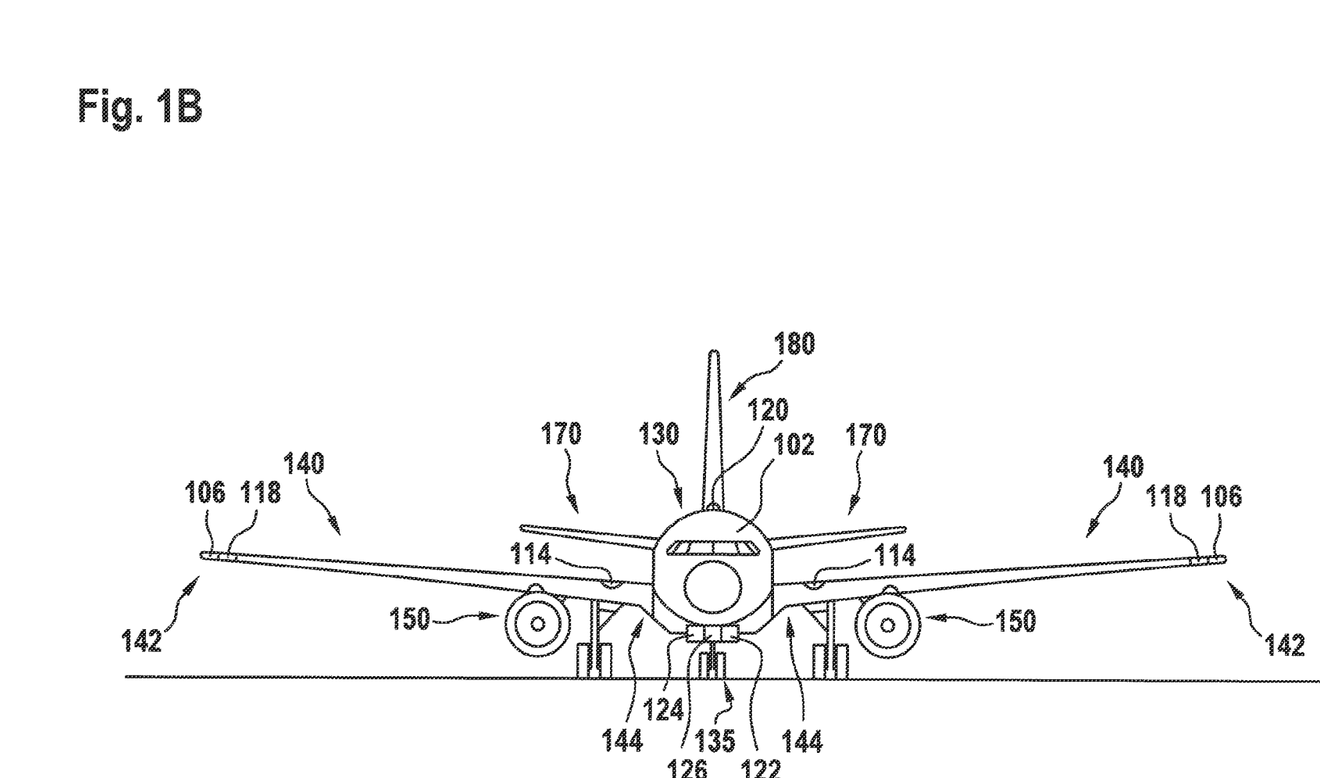
FIG. 1B shows a schematic front view of the aircraft shown in FIG. 1A.

FIGS. 1A and 1B, jointly referred to as FIG. 1 herein, show an aircraft 102, in particular an airplane, comprising a fuselage 130, which houses a cockpit 202 and a passenger cabin 204, and two wings 140, extending from the fuselage 130. Two horizontal stabilizers 170 and a vertical stabilizer 180 extend from a rear portion of the fuselage 130. An engine 150 is mounted to each of the wings 140, respectively. The aircraft 102 is shown in a top view in FIG. 1A and shown in a front view in FIG. 1B.

The aircraft 102 of FIG. 1 is equipped with a wide variety of exterior lights. In particular, the aircraft 102 is equipped with three navigation lights 106, two logo lights 108, two wing scan lights 110, two engine scan lights 112, two runway turn-off lights 114, two cargo loading lights 116, three white anti-collision strobe lights 118, two red-flashing anti-collision beacon lights 120, a landing light 122, a take-off light 124 and a taxi light 126. It is pointed out that these kinds of lights and their numbers are exemplary only and that the aircraft 102 may be equipped with additional lights that are not shown.

The three navigation lights 106 are positioned in the left and right wing tips 142 as well as at the the tail 160 of the aircraft 102. In normal flight conditions, each one of the navigation lights 106 emits light in one of the colors green, red and white, thus indicating to the aircraft environment if they are looking at the port side, starboard side or tail side of the aircraft. The navigation lights 106 are normally on during all phases of the flight and in all flight conditions.

The logo lights 108 are directed to the vertical stabilizer 180 of the aircraft 102 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144 of the wings 140 of the aircraft 102. The wing scan lights 110 and the engine scan lights 112 are normally off during the flight and may be switched on periodically or upon reasonable cause by the pilots or by the aircrew, in order to check the wings 140 and the engines 150 of the aircraft 102.

The runway turn-off lights 114 are positioned in the roots 144 of the wings 140. The runway turn-off lights 114 are directed forwards and are normally switched off during the flight and switched on during taxiing, at least at night.

The cargo loading lights 116 are positioned on the left and right sides of the fuselage 130, behind the wings 140 and in front of the tail structure of the aircraft 102. They are normally switched off during the flight of the aircraft 102.

The white anti-collision strobe lights 118 are positioned in the left and right wing tips 142 as well as at the tail 160 of the aircraft 102. The white anti-collision strobe lights 118 emit respective sequences of white light flashes during normal operation of the aircraft 102. It is also possible that the white anti-collision strobe lights 118 are only operated during night and in bad weather conditions.

The red-flashing anti-collision beacon lights 120 are positioned on the top and the bottom of the fuselage 130 of the aircraft 102. They are arranged at the height of the wings in the longitudinal direction of the aircraft 102. While one of the red-flashing anti-collision beacon lights 120 is disposed on the top of the fuselage 130, the other one of the red-flashing anti-collision beacon lights 120 is disposed on the bottom of the fuselage 130 and is therefore shown in phantom in FIG. 1A. The red-flashing anti-collision beacon lights 120 are normally switched on during taxiing and during take-off and landing. Their output is perceived as a sequence of red light flashes in a given viewing direction.

In the embodiment depicted in FIGS. 1A and 1B, the runway turn-off lights 114 are located in the wings 140, in particular in the roots 144 of the wings 140, and the landing light 122, the take-off light 124 and the taxi light 126 are mounted to the front gear 135 of the aircraft 102. The front gear 135 is stored within the fuselage 130 of the aircraft 102 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140, in particular in the roots 144 of the wings 140, of the aircraft 102.

The aircraft 102 may also comprise one or more multi-functional lights, which combine(s) the functionalities of at least two of a landing light, a take-off light, a taxi light, a runway turn-off light, a navigation light, a white strobe anti-collision light, and a red-flashing beacon light.

Since the landing light 122, the take-off light 124, and the taxi light 126 are arranged on the bottom of the aircraft 102, they are also depicted in phantom in FIG. 1A.

Each of these exterior aircraft lights may be an aircraft light according to an exemplary embodiment of the invention.

Figure 2:
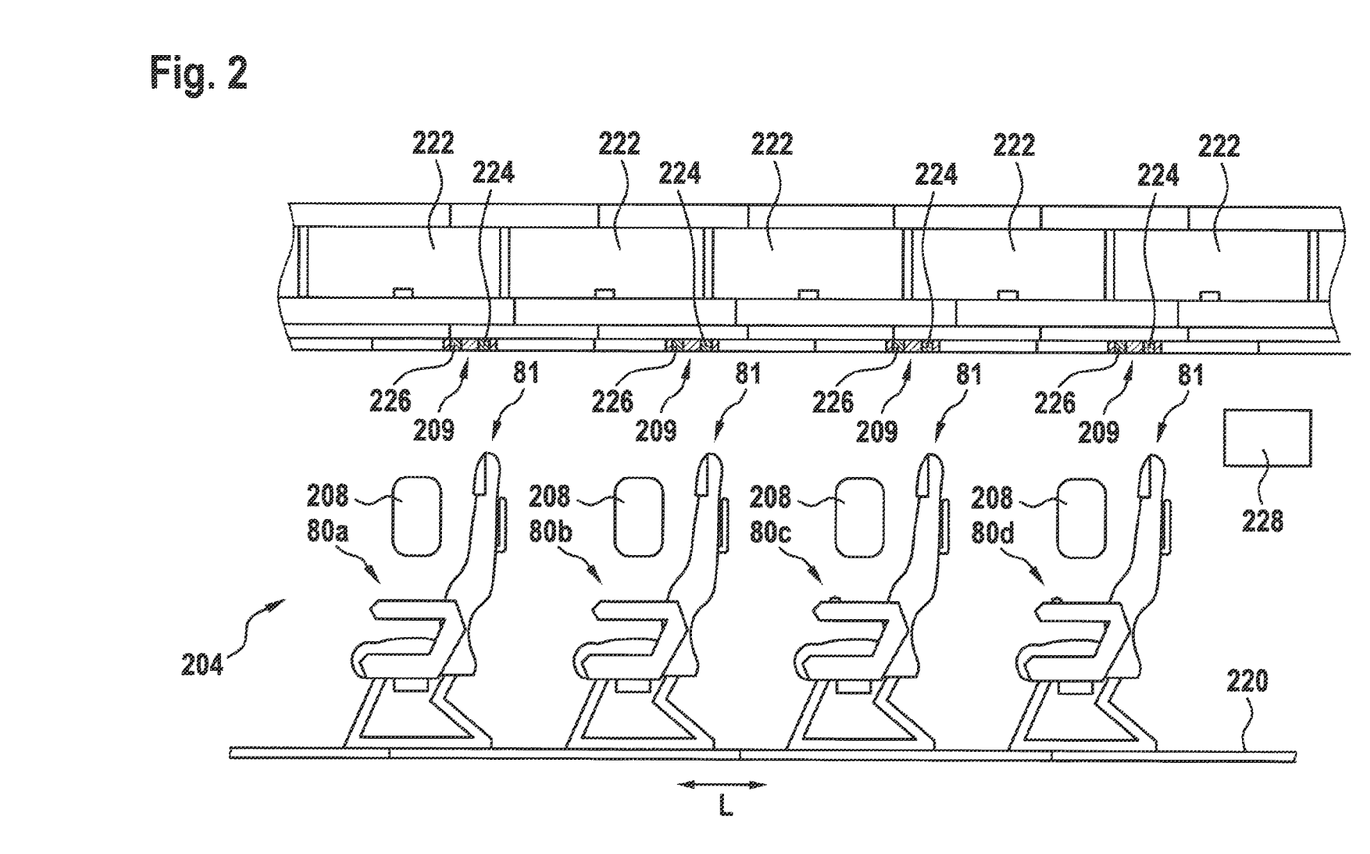
FIG. 2 shows a schematic longitudinal cross-sectional view of a section of the passenger cabin of the aircraft shown in FIGS. 1A and 1B.

FIG. 2 shows a schematic longitudinal cross-sectional view of a section of the passenger cabin 204 of the aircraft 102 shown in FIG. 1.

Four seats 81, which are also referred to as passenger seats 81, are visible in FIG. 2. The passenger seats 81 are mounted to a floor 220 of the passenger cabin 204. Each of the depicted passenger seats 81 belongs to a different seat row 80a-80d. The seat rows 80a-80d are spaced apart from each other along the longitudinal direction L of the passenger cabin 204.

For each of the seat rows 80a-80d, a window 208 is provided, which allows the passengers to view the outside of the aircraft 102. Further, a plurality of overhead baggage compartments 222, which provide storage space for the passengers' baggage, are provided above the passenger seats 81.

Each seat row 80a-80d may include a plurality of passenger seats 81, for example three passenger seats 81, which are arranged next to each other along a lateral direction, which is orthogonal to the longitudinal direction L. The additional passenger seats, i.e. the middle seat and the window seat, of each seat row 80a-80d are not visible in FIG. 2, as they are arranged behind and therefore hidden by the depicted aisle seats 81.

An aircraft overhead passenger service unit (PSU) 209 is provided above each of the seat rows 80a-80d, respectively.

Each of the aircraft overhead passenger service units 209 may comprise at least one interior aircraft light. Each of the aircraft overhead passenger service units 209 may, for example, comprise a plurality of reading lights 224, wherein the light output of each of the reading lights 224 is directed towards one of the passenger seats 81 arranged below the respective aircraft overhead passenger service unit 209. Each of the aircraft overhead passenger service units 209 may further comprise one or more signal lights 226, which may, for example, light up in case a request for the cabin service personnel has been triggered by a passenger.

The passenger cabin 204 may further comprise at least one general cabin illumination light 228 for illuminating the passenger cabin 204. Washroom illumination lights may be installed within washrooms provided within the passenger cabin 204.

Each of these interior aircraft lights may be an aircraft light according to an exemplary embodiment of the invention.

Figure 3:
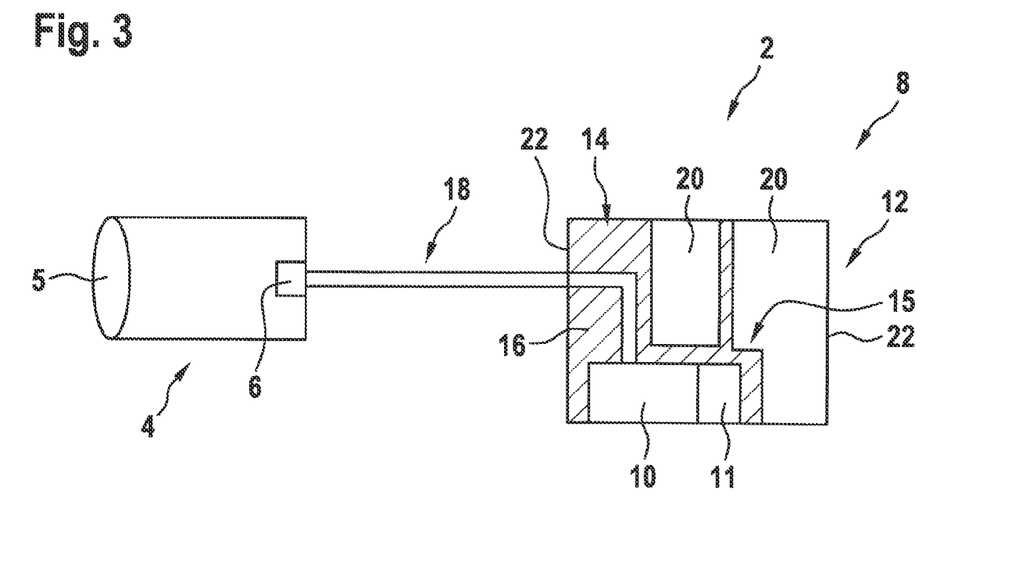
FIG. 3 depicts a schematic diagram of an aircraft light according to an exemplary embodiment of the invention.

FIG. 3 depicts a schematic diagram of an aircraft light 2 according to an exemplary embodiment of the invention.

The aircraft light 2 comprises a lighting module 4 which houses a light source 6, for example an LED. The lighting module 4 may also house a plurality of light sources 6, for example a plurality of LEDs. The aircraft light 2 further comprises a local electric power supply 8 for supplying electric power to the at least one light source 6.

In addition to the at least one light source 6, the lighting module 4 may comprise at least one optical element, arranged for shaping an aircraft light output of the aircraft light 2 from the light emitted by the at least one light source 6. In the exemplary embodiment of FIG. 3, a collimating lens 5 is arranged for targeting the light, as emitted by the at least one light source 6, into and around a particular target direction. It is understood that other types of lenses, such as free form lenses, may be employed for shaping a desired light output. Also, multiple lenses may be employed. It is further understood that the aircraft light 2 may comprise, in addition to or as an alternative to the one or more lenses, one or more reflectors and/or one or more shutters.

The local electric power supply 8 comprises power supply electronics 10, which are accommodated in a power supply housing 12. The power supply electronics 10 are configured for providing power to the at least one light source 6.

The local electric power supply 8 may further comprise control electronics 11 for controlling an operation of the at least one light source 6. The control electronics 11 may in particular be formed integrally with the power supply electronics 10.

The power supply housing 12 is produced by additive manufacturing, which is also known as 3D-printing. The power supply housing 12 comprises a compartment 14, which accommodates the power supply electronics 10 and the control electronics 11, if present, and at least one hollow cavity 20, which is delimited from the compartment 14.

The compartment 14, but not the at least one hollow cavity 20, is filled with a potting material 16 enclosing the power supply electronics 10 and the control electronics 11, if present. The potting material 16 is impermeable to liquids, such as water, and gases, such as air, for protecting the power supply electronics 10 and the control electronics 11, if present, from dirt and moisture.

The aircraft light 2 further comprises a plurality of electric connections 18, such as electric lines, extending from the power supply electronics 10 through the potting material 16 to the at least one light source 6 for supplying electric power to the at least one light source 6, in order to operate the at least one light source 6 and enable an aircraft light output of the aircraft light 2.

In the embodiment depicted in FIG. 3, the power supply housing 12 is shown spatially separated from the lighting module 4. In alternative embodiments, which are not explicitly shown in the figures, the power supply housing 12 may be mounted to the lighting module 4. The power supply housing 12 may also be formed integrally with the lighting module 4. The power supply housing 12 may in particular be formed on and/or together with the lighting module 4 by additive manufacturing.

For ease of illustration, the power supply housing 12 is depicted larger than the lighting module 4 in FIG. 3. It is understood that, in most practical applications, the lighting module 4 will be larger than the power supply housing 12. For example, the lighting module 4 may be a light head of an aircraft headlight, such as a light head of a landing light or take-off light, and may, as such, have an extension of between 10 cm and 20 cm. In such an application, the power supply housing 12 may have an extension of up to 25 cm, in particular of between 5 cm and 25 cm.

Figure 4:
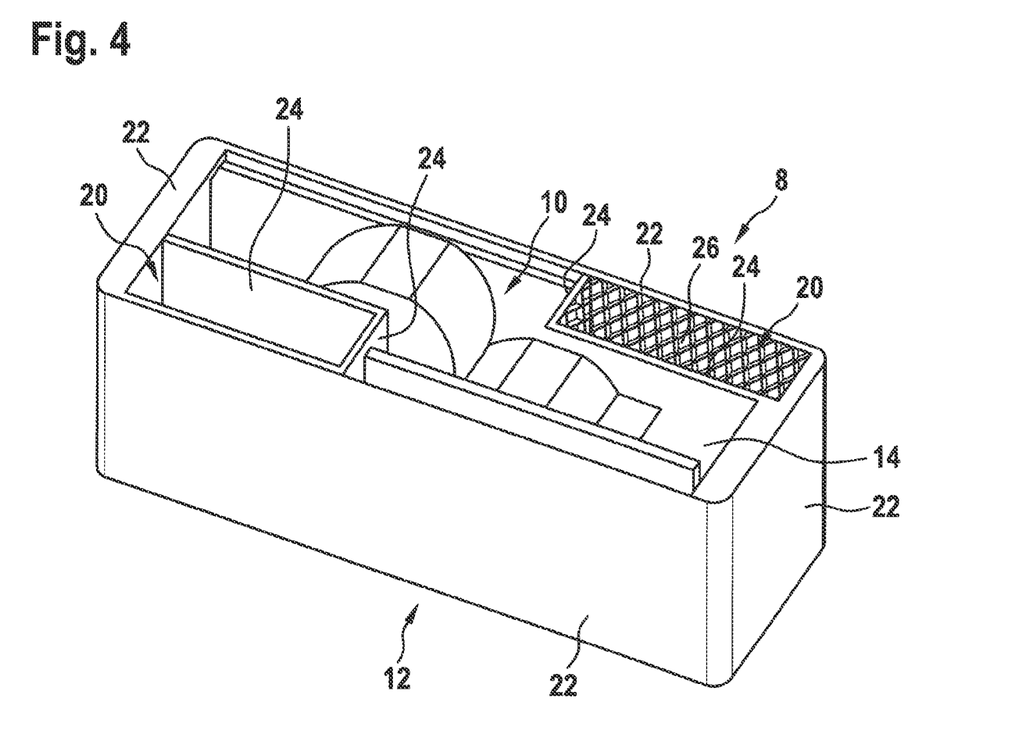
FIG. 4 depicts a perspective view of a power supply housing as may be used in an aircraft light according to an exemplary embodiment of the invention.
Figure 5:
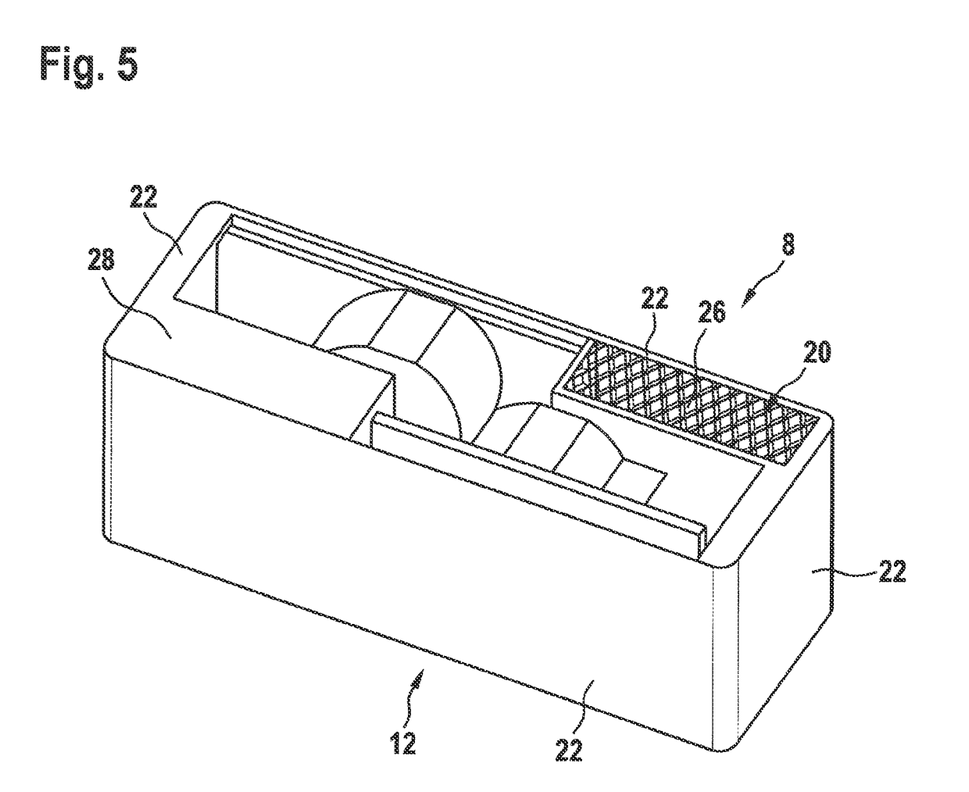
FIG. 5 depicts a perspective view of a power supply housing as may be used in an aircraft light according to another exemplary embodiment of the invention.

FIG. 4 depicts a perspective view of a power supply housing 12 as may be used in an aircraft light according to an exemplary embodiment of the invention. FIG. 5 depicts a perspective view of another power supply housing 12 as may be used in an aircraft light according to another exemplary embodiment of the invention. The power supply housing 12 of FIG. 4 and the power supply housing of FIG. 5 may for example be employed in the aircraft light 2 of FIG. 3.

Each of the power supply housings 12 depicted in FIGS. 4 and 5 has a basically cuboid shape, comprising a bottom, which is not visible in the perspective views shown in FIGS. 4 and 5, and four outer power supply housing walls 22. The bottom and the four outer power supply housing walls 22 define a trough-type structure that comprises a compartment 14, which accommodates the power supply electronics 10.

The outer edges of the power supply housing 12 may be rounded, as shown in FIGS. 4 and 5.

The power supply housing 12 may have different geometries, which are not explicitly shown in the figures. The geometry and the outer dimensions of the power supply housing 12 may be set in accordance with the intended use of the aircraft light 2, in particular in accordance with the space that is available at the position within the aircraft 102 at which the aircraft light 2 is intended to be installed. Also, the geometry and outer dimensions of the power supply housing 12 may be set in accordance with available and/or pre-defined mounting fixtures, provided for holding the aircraft light 2 and/or the power supply housing 12 of the aircraft light 2 in position.

As can be seen in FIGS. 4 and 5, the compartment 14, which houses the power supply electronics 10, is not completely filled by the power supply electronics 10. In order to protect the power supply electronics 10 from adverse external influences, such as water, moisture and/or dirt, the empty space that remains within the compartment 14, after the power supply electronics 10 have been installed within the compartment 14, is filled with a potting material. Said potting material 16 is not shown in FIGS. 4 and 5.

Since typical potting materials 16, for example silicone or resin based potting materials, have a relatively high density, the potting material 16 contributes considerably to the weight of the local electric power supply 8. In consequence, the weight of the local electric power supply 8 may be reduced by reducing the amount of potting material 16 that is filled into the compartment 14.

In order to reduce the amount of potting material 16 within the power supply housing 12, the volume that is occupied by the potting material 16, when the compartment 14 is filled with the potting material 16, is reduced by at least one hollow cavity 20 formed within the power supply housing 12. The at least one hollow cavity 20 is delimited from the compartment 14, which accommodates the power supply electronics 10, by at least one inner wall 24. The at least one inner wall 24, which defines the at least one hollow cavity 20, may be formed by additive manufacturing. In particular, the at least one inner wall may be formed in a joint additive manufacturing process together with the bottom and the outer walls of the power supply housing 12.

In the embodiment depicted in FIG. 4, two structures of hollow cavities are formed. In particular, the two structures of hollow cavities are formed at diagonally opposing corners of the power supply housing 12. These positions of the hollow cavity structures are, however, only exemplary, and hollow cavities 20 may be formed at alternative and/or additional positions within the power supply housing 12 as well.

Forming the inner walls 24 by additive manufacturing allows for a large flexibility regarding the geometry of the inner walls 24. In other words, by additive manufacturing, inner walls 24 and hollow cavities 20 having almost arbitrary geometries may be formed within the power supply housing 12. In consequence, the geometries of the inner walls 24 and of the hollow cavities 20 may be individually adapted to the actual shape of the power supply housing 12 and the actual shape of the the power supply electronics 10, in order to reduce the remaining empty space, which is filled with the potting material 16, to a large extent.

Forming the inner walls 24 by additive manufacturing may in particular allow for forming wall portions that extend from an outer power supply housing wall 22 into the interior of the power supply housing 12, thereby forming undercuts and/or similar geometric structures, which may be impossible to be formed or which may at least be difficult to be formed by molding or similar manufacturing techniques.

A geometric shape of a hollow cavity 20 that forms an undercut 15 within the compartment 14 is schematically shown in FIG. 3. In the configuration depicted in FIG. 3, a portion of the power supply electronics 10 is arranged between the undercut 15 and the bottom of the power supply housing 12.

In order to increase the mechanical stability, in particular the mechanical rigidity of the power supply housing 12, supportive structures, such as honeycomb structures 26, may be formed by the inner walls 24 within the compartment 14. In a honeycomb structure 26, the inner walls 24 may form a packed structure of a comparably large number of hollow cavities 20. In other words, a large number of hollow cavities 20 may be provided in a nested/densely packed hollow cavity structure. A hollow cavity structure, which is in the form of a honeycomb structure 26, is exemplarily depicted in FIGS. 4 and 5. The inner walls 24 that constitute the honeycomb structure 26 may be formed effectively and efficiently by additive manufacturing. Said additive manufacturing of the inner walls 24 may take place together with the additive manufacturing of the bottom and the outer power supply housing walls 22 of the power supply housing 12. In this case, no additional manufacturing steps may be necessary for forming the inner walls 24 that constitute the honeycomb structure 26.

Alternatively or additionally to forming honeycomb structures 26 or other structures of hollow cavities 20, it is also possible to provide one or more infills 28 within the power supply housing 12, as it is depicted in FIG. 5. The infill 28 may be made from a material identical to the material that is used for the additive manufacturing, such as ULTEM 9085 or ULTEM 1010. In this case, the at least one infill 28 is considered at least one solid infill 28. The at least one solid 28 infill may be formed by additive manufacturing together with the power supply housing 12, so that no additional manufacturing steps are needed for forming the at least one solid infill 28. In case the material for additive manufacturing is lighter than the potting material, it is still possible to save weight with such solid infills. Solid infills may be used to balance the weight of the power supply housing 12 and/or to fill part(s) of the volume of the power supply housing 12 where honeycomb structures or other hollow cavity structures are not desired.

As compared to previous approaches, embodiments of the present invention allow for reducing the weight of a local electric power supply of an aircraft light, while maintaining good mechanical and electrical properties of the local electric power supply and maintaining a desired/predefined outer shape of the local electric power supply.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft light, comprising:
   at least one light source; and
   a local electric power supply for supplying electric power to the at least one light source;
   wherein the local electric power supply comprises a power supply housing produced by additive manufacturing;
   wherein the power supply housing comprises:
      a compartment accommodating power supply electronics; and
      a plurality of hollow cavities, which are delimited from the compartment;
   wherein the compartment is filled with a potting material;
   wherein the aircraft light further comprises a plurality of electric connections extending from the power supply electronics through the potting material to the at least one light source for supplying the electric power to the at least one light source, thus enabling an aircraft light output of the aircraft light; and
   wherein the at least some of the plurality of hollow cavities are in particular arranged to form a honeycomb structure.

2. The aircraft light according to claim 1, wherein the aircraft light comprises a lighting module, wherein the lighting module comprises the at least one light source and at least one optical element arranged for shaping the aircraft light output of the aircraft light, wherein the least one optical element in particular includes at least one lens and/or at least one reflector and/or at least one shutter.

3. The aircraft light according to claim 2,
   wherein the power supply housing is formed integrally with the lighting module, wherein the power supply housing is in particular formed on the lighting module by additive manufacturing, or
   wherein the power supply housing is mounted to the lighting module.

4. The aircraft light according to claim 2, wherein the power supply housing is spatially separated from the lighting module.

5. The aircraft light according to claim 1, wherein the power supply housing is made from ULTEM 9085 or ULTEM 1010 by additive manufacturing.

6. The aircraft light according to claim 1, wherein the power supply housing accommodates control electronics for controlling an operation of the at least one light source, wherein the control electronics are in particular integrally formed with the power supply electronics.

7. The aircraft light according to claim 1, wherein the aircraft light is an exterior aircraft light, wherein the exterior aircraft light is in particular a landing light, a take-off light, a taxi light, a runway turn-off light, a navigation light, a white strobe anti-collision light, a red-flashing beacon light, or a multi-functional light, which combines functionalities of at least two of the landing light, the take-off light, the taxi light, the runway turn-off light, the navigation light, the white strobe anti-collision light, and the red-flashing beacon light.

8. An aircraft, in particular an airplane or a helicopter, comprising the aircraft light according to claim 1.

9. An aircraft light, comprising:
   at least one light source; and
   a local electric power supply for supplying electric power to the at least one light source;
   wherein the local electric power supply comprises a power supply housing produced by additive manufacturing;
   wherein the power supply housing comprises:
      a compartment accommodating power supply electronics; and
      a plurality of hollow cavities, which are delimited from the compartment;
   wherein the compartment is filled with a potting material;
   wherein the aircraft light further comprises a plurality of electric connections extending from the power supply electronics through the potting material to the at least one light source for supplying the electric power to the at least one light source, thus enabling an aircraft light output of the aircraft light; and
   wherein the power supply housing further comprises at least one infill, wherein the at least one infill in particular extends from an outer power supply housing wall into the compartment, forming an undercut within the compartment.

10. The aircraft light according to claim 9, wherein the aircraft light comprises a lighting module, wherein the lighting module comprises the at least one light source and at least one optical element arranged for shaping the aircraft light output of the aircraft light, wherein the at least one optical element in particular includes at least one lens and/or at least one reflector and/or at least one shutter.

11. The aircraft light according to claim 10,
    wherein the power supply housing is formed integrally with the lighting module, wherein the power supply housing is in particular formed on the lighting module by additive manufacturing, or
    wherein the power supply housing is mounted to the lighting module.

12. The aircraft light according to claim 10, wherein the power supply housing is spatially separated from the lighting module.

13. The aircraft light according to claim 9, wherein the at least one infill is solidly made from the same material as the power supply housing.

14. The aircraft light according to claim 9, wherein the power supply housing is made from ULTEM 9085 or ULTEM 1010 by additive manufacturing.

15. The aircraft light according to claim 9, wherein the power supply housing accommodates control electronics for controlling an operation of the at least one light source, wherein the control electronics are in particular integrally formed with the power supply electronics.

16. The aircraft light according to claim 9, wherein the aircraft light is an exterior aircraft light, wherein the exterior aircraft light is in particular a landing light, a take-off light, a taxi light, a runway turn-off light, a navigation light, a white strobe anti-collision light, a red-flashing beacon light, or a multi-functional light, which combines functionalities of at least two of the landing light, the take-off light, the taxi light, the runway turn-off light, the navigation light, the white strobe anti-collision light, and the red-flashing beacon light.

17. An aircraft, in particular an airplane or a helicopter, comprising the aircraft light according to claim 9.

* * * * *

UNITED STATES PATENT AND TRADEMARK OFFICE
CERTIFICATE OF CORRECTION

| | | |
|---|---|---|
| PATENT NO. | : 12,325,534 B2 | Page 1 of 1 |
| APPLICATION NO. | : 18/598305 | |
| DATED | : June 10, 2025 | |
| INVENTOR(S) | : Thomas Ebbers et al. | |

It is certified that error appears in the above-identified patent and that said Letters Patent is hereby corrected as shown below:

In the Claims

Column 11, Claim 2, Line 40, delete "the least one" and insert --the at least one--

Signed and Sealed this
Nineteenth Day of August, 2025

Coke Morgan Stewart
*Acting Director of the United States Patent and Trademark Office*